United States Patent [19]

Liu et al.

[11] 4,015,582
[45] Apr. 5, 1977

[54] SOLAR HEAT COLLECTOR

[75] Inventors: Benjamin Y. H. Liu, Minneapolis; Richard C. Jordan; Klaus Willeke, both of St. Paul, all of Minn.

[73] Assignee: The Regents of the University of Minnesota, Minneapolis, Minn.

[22] Filed: May 31, 1974

[21] Appl. No.: 474,941

[52] U.S. Cl. .................................. 126/270; 126/271
[51] Int. Cl.² .......................................... F24J 3/02
[58] Field of Search ........................... 126/270, 271

[56] References Cited

UNITED STATES PATENTS

| | | | |
|---|---|---|---|
| 2,566,327 | 9/1951 | Hallock | 126/270 X |
| 2,998,005 | 8/1961 | Johnston | 126/270 |
| 3,102,532 | 4/1963 | Shoemaker | 126/270 |
| 3,266,565 | 8/1966 | Tiley | 126/270 X |
| 3,303,838 | 2/1967 | Thomason | 126/271 |
| 3,875,925 | 4/1975 | Johnston | 126/270 |

Primary Examiner—John J. Camby
Assistant Examiner—Larry I. Schwartz
Attorney, Agent, or Firm—Burd, Braddock & Bartz

[57] ABSTRACT

A highly efficient solar heat collector characterized by a layer of light transmitting insulating (i.e., convection and infra-red radiation suppressing) material disposed between the outer surface of the collector and the heat absorptive layer thereof. Glass fibers are a particularly effective lightweight insulating material which may be used. Through use of flexible polymeric films, lightweight, low-cost solar heat collectors may be fabricated for conversion of existing structures to partial or complete solar heating. Either gaseous or liquid heat transfer fluids may be used. A novel gas-liquid heat exchange system is disclosed.

14 Claims, 8 Drawing Figures

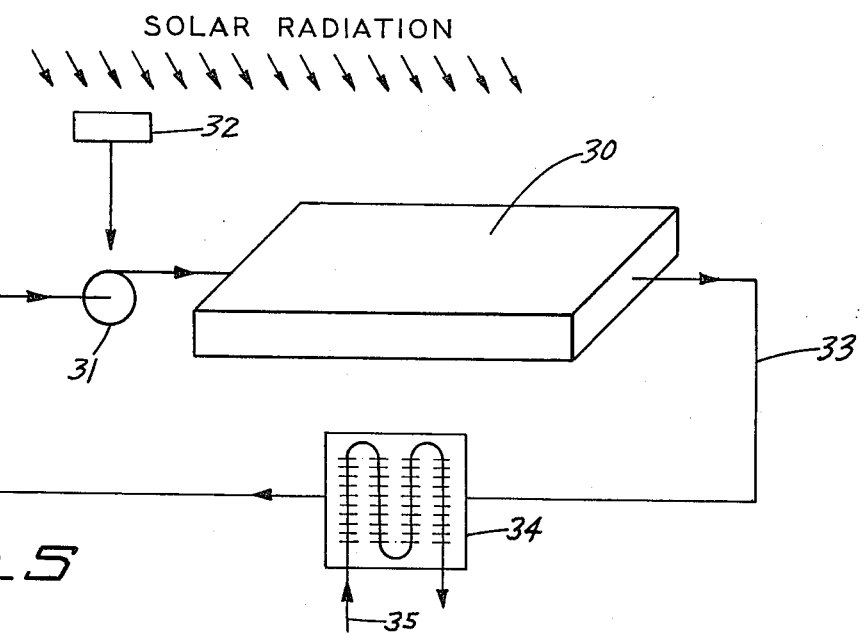
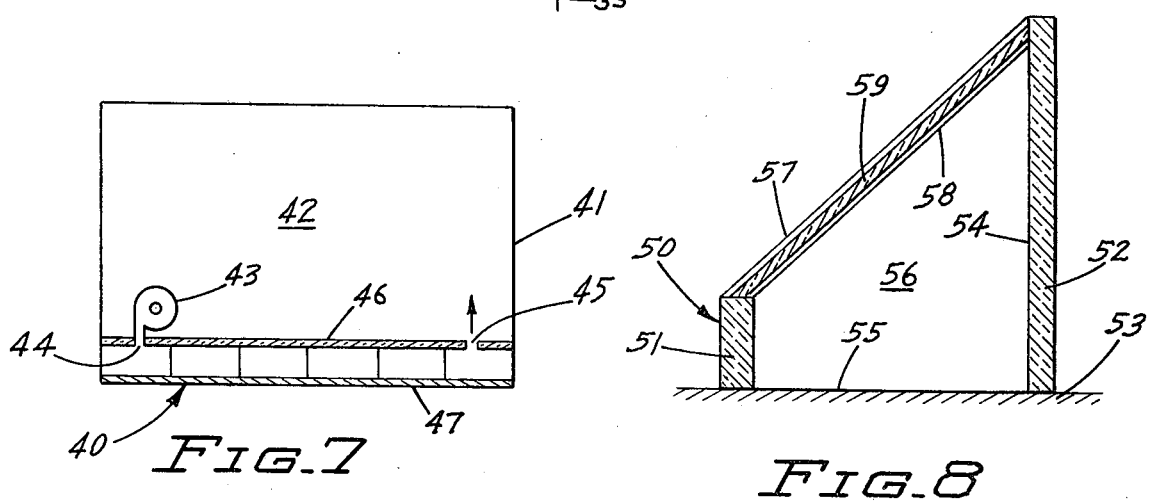
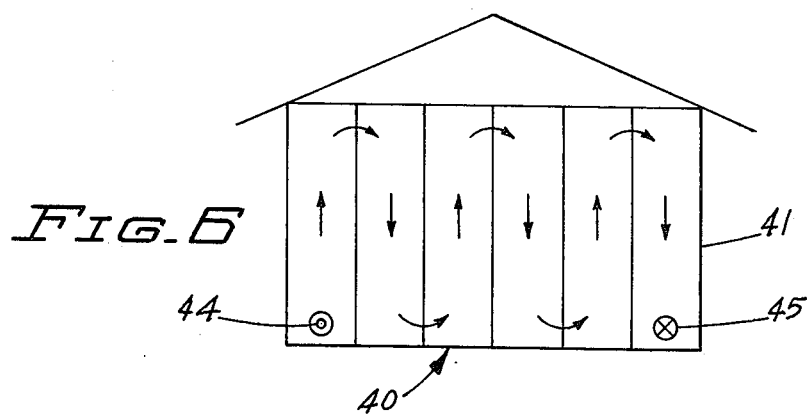

SOLAR HEAT COLLECTOR

BACKGROUND OF THE INVENTION

During the past 20 years several experimental solar houses have been constructed in the United States. These experiments have shown not only that solar heating is technically feasible but that the collector system can be constructed with relatively unsophisticated technologies. What has prevented solar heating from being more widely utilized has been the relatively high cost of the collector system and the ready availability of inexpensive liquid and gaseous fuels. With the cost of conventional heating fuels expected to rise sharply in the coming decade, the development of a truly low-cost solar collector system will make it possible to adopt solar heating on a wide scale.

FIELD OF THE INVENTION

This invention is direccted to several forms of simple, low-cost, lightweight solar heat collectors adapted for heating homes, farm buildings, greenhouses, swimming pool enclosures, and the like, or for supplementing heat from conventional fuel sources. More especially this invention relates to solar collectors provided with means for reducing heat loss through the collector cover and a collector system with means to transfer the collected solar heat from a gas to a liquid.

DESCRIPTION OF THE PRIOR ART

Conventional flat-plate collectors generally consist of a black radiation-absorbing surface backed by insulation and one or more layers of transparent covers. Thomason U.S. Pat. Nos. 3,145,707; 3,236,294; 3,254,643; 3,303,838 and 3,387,602; Masters U.S. Pat. No. 3,513,828; Andrassy U.S. Pat. No. 3,022,781 are representative.

Solar radiation is transmitted through the transparent cover and absorbed by the black surface. The absorbed solar heat can be removed by air, water, or other suitable heat transfer fluid passed in heat exchanging relationship with the heated surface and and can be used for such purposes as space heating, hot-water heating and the drying of agricultural crops. In general, the device is best suited for those applications requiring thermal energy at comparatively low temperature levels, typically below the boiling point of water.

The conventional flat-plate collector suffers from one major disadvantage, viz, the relatively poor insulating property of the air space between the transparent cover and the heat-absorbing plate. The transfer of heat across an air space occurs by the process of convection and radiation. Since the air space (typically ¼ to 1 inch wide is relatively open, convection occurs easily. Thermal radiation exchange between the surfaces forming the boundaries of the air space also occurs totally unimpeded because air is transparent to the thermal radiation emitted by the surfacs. Thus, heat loss through the transparent cover is quite rapid, reducing both the useful energy output of the collector as well as the collector efficiency. Although this heat loss can be reduced by the use of multiple covers or by coating the surface with a material of low infra-red emittance, these approaches are not totally satisfactory because of the increased weight or cost, or both, which makes the already expensive collector even more expensive.

SUMMARY OF THE INVENTION

According to one form of the invention, solar collectors are provided having multiple layer light-transmitting covers in which the air space between adjacent layers is filled with a fibrous material, the fibers being made of a material that is transparent to solar radiation, such as glass. The presence of these fibers in the air space greatly reduces the convection current, and if the fibers are made of a material such as glass, which is also opaque to the infra-red radiation emitted by the surfaces, direct radiation exchange between the surfaces is greatly reduced or totally stopped.

According to another form of the invention, the glass panes which trap the solar heat in a conventional rigid collector are replaced by two or more transparent, flexible films, separated by spacers made of a material which is strong enough to hold the films apart from each other, thereby creating an air buffer between the films. Or, the films may be separated by sealed air bubbles, such as found in the form used in the packaging industry for vibration and shock absorption.

In a further form of the invention, an inflatable solar collector with multiple layers of transparent, flexible film is used to trap the solar heat. The collector is inflated by air blown into the space between the absorbing surface and the innermost transparent film, while bleed holes in the films allow a small amount of air to escape, thus creating the pressure drop necessary for inflation and providing the necessary air buffer between the films to reduce heat loss.

The invention also includes a novel collector system with means to transfer the collected solar heat from a gas to a liquid.

BRIEF DESCRIPTION OF THE DRAWINGS

The invention is illustrated in the accompanying drawings in which the same numerals identify corresponding parts and in which:

FIG. 5 is a schematic representation of a system for utilizing the heat from a solar heat collector;

FIG. 6 is a schematic elevation of a building showing one manner in which a plurality of solar collectors may be assembled in series on the building;

FIG. 7 is a longitudinal section through the building of FIG. 6; and

FIG. 8 shows an enclosure having a roof formed from a transparent insulating cover.

DETAILED DESCRIPTION OF THE PREFERRED EMBODIMENTS

Figure 1:
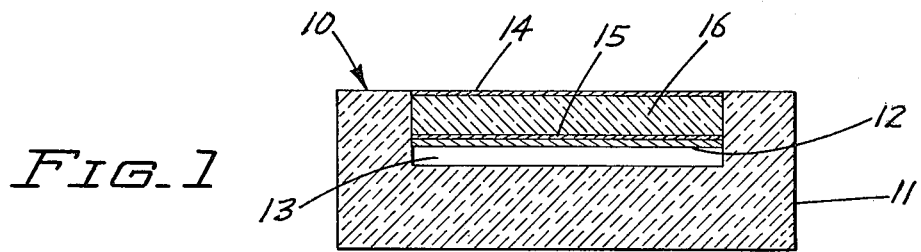
FIG. 1 is a schematic representation of one form of solar heat collector utilizing air or other gas as the heat transfer fluid, shown in transverse section.

Referring now to FIG. 1, there is shown in transverse section a solar heat collector, indicated generally at 10, utilizing air or other gas as the heat transfer fluid. The collector 10 includes a heat insulative base 11 formed from conventional insulating materials, such as asbestos board; fiber board; mineral wool batting; cellular glass; fiber glass batting; foamed and cellular plastic material, either rigid or flexible, such as polystyrene, polyurethane, etc.; and the like. A sheet or layer 12 of heat absorbing material overlies the insulative base spaced therefrom to define a channel 13 for gas flow. The heat absorbing surface may likewise be rigid or flexible in the form of a blcak or blackened plate or film such as a painted metal sheet or dyed or pigmented polymer rigid or semi-rigid sheet or flexible film. The heat absorbing surface can also be in the form of a porous medium such as dyed, pigmented, or painted glass fibers, painted metal fibers or painted screens with high solar absorptance. A protective cover overlies the heat absorbing surface. The protective cover is in the form of a sandwich comprising spaced apart sheets 14 and 15 composed of light transmitting material with the air space in between partially occupied by a light transmitting and insulating (i.e., convection and infra-red radiation suppressing) packing 16, such as randomly arrayed, loosely packed glass fibers in the form of a mat or batting. As is apparent, in order for the protective cover to functon as an air buffer, it must be impervious to the passage of air through the cover and sheets 14 and 15 are formed from material which of necessity is non-porous and relatively impermeable to the passage of air. Both sheets 14 and 15 may be rigid or flexible, or outer sheet 14 may be rigid and inner sheet 15 may be flexible, and made from light transmitting materials such as glass, glass fiber reinforced plastic sheeting, polymer films and the like. Where weight and cost are important factors, films are used. Tough durable films such as polyvinyl fluoride films such as sold as "Tedlar" are desirable films capable of withstanding long usage and resistant to degradation from exposure to solar radiation.

The functions of heat absorbing layer 12 and inner protective cover sheet 15 may in some instances be combined in a single layer. For example, inner sheet 15 may be formed from black polymer film, in which event another heat absorbing layer is unnecessary. In some instances channel 13 may be located between the heat absorbing layer and the protective cover. Likewise, the heat absorbing surface may be located within channel 13 with gas flowing on both sides of the surface, or in the case of a porous heat absorbing medium such as pigmented, dyed or painted glass fibers or painted metal screens, the gas would flow partially or wholly through the medium. Although one air space is shown, it is understood that there can be more than one air space and that the insulating material can be separated by thin plastic or glass sheets or separated into individual pockets to further reduce convection.

It has been found that the use of convection and infra-red suppressing packing 16 enhances the so-called "greenhouse effect," the sequence of phenomena comprising the absorption of solar radiation and the prevention of its dissipation into space resulting in a steady gradual rise in the temperature in channel 13. In an experimental unit in which the protective cover was a batt of glass fiber two inches thick placed below a layer of "Tedlar" film and using a plate of black painted aluminum as a heat absorptive layer, temperatures of over 110°C were achieved, the ambient temperature being 8°C.

While glass fiber is a desirable material for filling the air space to reduce heat loss, the material does not have to be glass, nor does it have to be in the form of fibers. Other natural and artificial fibers which are capable of transmitting light may be used, such as mineral fibers; polymeric fibers, such as polyacrylonitrile (Dynel, Orlon), nylon, polyester (Dacron), polyvinyl, and the like; cellulosic fibers of artificial or plant origin, such as rayon, alpha cellulose, cotton jute, sisal, flax, and the like; fibers of animal origin, such as wool, silk, etc. Any other material that is reasonably transparent to solar radiation can be used. The material can be in the form of solid or hollow particles of microscopic or macroscopic size. It can also be in the form of rigid or flexible foam with entrapped gas bubbles. Fused plastic films containing entrapped gas bubbles and plastic honeycomb or similar structures which partially or fully entrap the air, such as those commonly used for packaging, can also be used.

In general, these materials are not totally "transparent." Their appearance can best be described as "translucent." Perfect transparency is not required for flat-plate collector operation.

Figure 2:
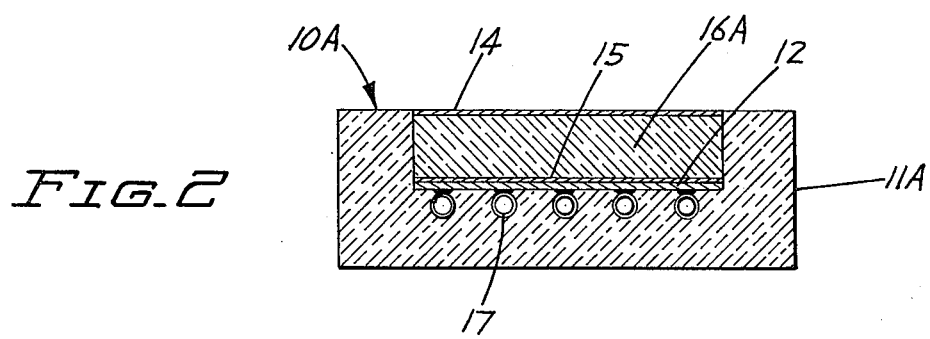
FIG. 2 is a similar schematic representation of a heat collector utilizing water or other liquid as the heat transfer fluid.

Referring now to FIG. 2, there is shown in transverse section a similar solar heat collector, indicated generally at 10A, utilizing water or other liquid as the heat transfer fluid. This collector is generally as described except that, instead of gas channel 13, liquid flow passages, such as pipes or tubes 17, are in close thermal contact with the heat absorbing layer 12. The liquid flow passages 17 may be incorporated into the heat absorptive layer, as by forming between a pair of aluminum sheets, one surface of which is blackened.

Figure 3:
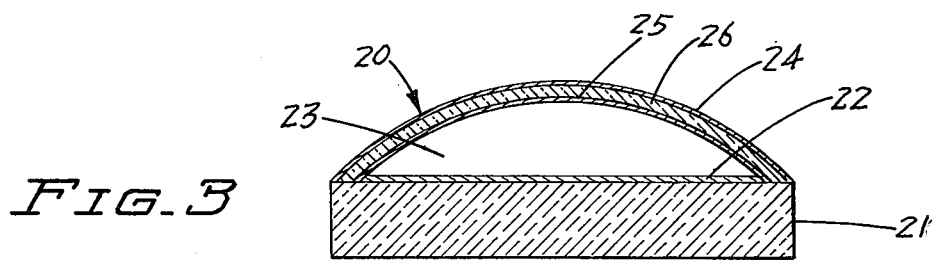
FIG. 3 is a similar representation of an inflatable solar collector.

FIG. 3, shows an inflatable solar collector of extreme light weight and low cost, indicated generally at 20. This form of collector has an insulative base 21, as described in connection with FIG. 1. It has a heat absorbing layer 22, as described. An air space 23 is enclosed between the heat absorptive layer and a protective light transmitting cover comprised of a sandwich made up of flexible films 24 and 25 on either side of a layer of lightweight insulating packing 26, such as glass fiber batting, plastic bubbles containing entrapped air, or the like. The packing filled collector cover is supported by gas pressure and air or other gas is blown into the space between the heat absorbing surface 22 and the inner surface of the collector cover. Several such buffered film covers may be mounted on top of each other. A similar arrangement of insulating films can be used as insulation backing for the solar collector. The heat-exposed side, however, should have a coating suitable for heat absorption.

Figure 4:
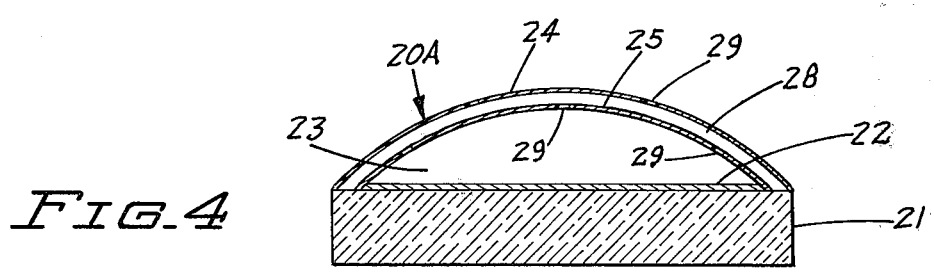
FIG. 4 shows another form of inflatable collector.

FIG. 4 shows a similar inflatable collector, indicated generally at 20A, with two or more layers of transparent or translucent covers of flexible films 24 and 25, such as polymeric film. Air or other gas is blown into the space 23 between the innermost film 25 and the heat absorbing surface 22. To keep the outer layers 24 of film separated from each other and from the inner film 25, the films are punctured by small holes 29 to allow a small amount of "bleed air" or other gas to escape through these holes. The pressure drop associated with the flow of the gas causes the individual layers of film to be fully inflated and separated from each other. This is necessary in order to create a gas buffer between the adjacent layers of translucent film to minimize heat loss to the ambient. The bleed holes 29 are laterally displaced from one another in adjacent film layers. medium FIG. 5 shows a solar heat collector 30 with air or other gas as the heat transfer medium and the subsequent transfer of this heat into a liquid such as water for such purposes as water heating, refrigeration, or heat storage. Blower 31 is activated when the sensor 32 indicates sufficient solar intensity for collector operation. As the gas passes through the collector, it is heated to a higher temperature. This heated gas then passes through suitable ducts along flow line 33 through the heat exchanger 34 where the heat is extracted by the liquid 35 flowing through the heat exchanger. The gas is then recirculated to the collector for further heating. The heated liquid may then be utilized in heat exchange and storage systems known in the prior art.

The use of gas as the heat transfer fluid and the use of the heat exchanger in this manner have two main advantages: (1) the weight of the collector can be much reduced, and (2) the heat exchanger can be located inside the house or in an enclosure to prevent the liquid from coming into direct contact with freezing temperatures during winter since the blower and the gas circulation through the heat exchanger may be stopped at night or during periods of low sunshine.

It is understood that the collectors are made in individual modules of a suitable size. The modules can be connected in series or in parallel, or in any combination thereof. The solar collectors can be applied to the roof of a house or to any vertical south-facing or nearly south-facing surface. For application in the northern United States, where snow buildup is expected to be a problem for roof collectors, the collectors should be mounted at a steep angle or on south-facing walls or on any free-standing vertical surface not too far away from the energy-consuming buildings. These lightweight collectors are adapted to installation on the sides of silos and corn storage bins, and similar structures commonly found on farms that are often heated by liquefied petroleum gases or by fuel oils, both of which are in short supply now and will be in the foreseeable future.

FIGS. 6 and 7 are schematic diagrams of a series of collectors 40 installed on the south-facing walls of a building 41. Air from the building interior or heat storage area 42 is circulated by pump 43 through a duct 44 into the first of the series of collectors 40. The collectors are connected in series so that the air flows from each collector to the next adjacent downstream collector in a serpentine path denoted by the arrows. The air temperature gradually and steadily increases and the hot air is returned through duct 45 to the building interior, heat storage area or heat exchanger. The collectors each have an insulative base 46 and light transmitting, insulating cover 47 according to one of the described forms.

FIG. 8 shows the roof of a greenhouse or a swimming pool enclosure in which the entire structure 50 functions as a solar heat collector. The walls 51 and 52 and supporting floor or ground 53 serve as an insulative base. The interior wall surface 54 and floor surface 55 serve as heat absorptive surfaces and are desirably painted black or other dark color. The interior air space 56 is enclosed by a light transmitting, insulative cover comprised of a sandwich of spaced apart parallel transparent or translucent sheets 57 and 58 and a core of packing material 59, as already described. Desirably means are also provided for circulating heated air from the enclosed space for heating other areas and for avoiding over-heating of the space.

The inflatable flexible film form of solar heat collector and the flat plate form of collector using polymer sheet or film utilizing air as the heat transfer medium are especially adapted for the heating of existing structures which are not able to carry the added weight of glass plate collectors. This light weight, coupled with low cost of material, makes it feasible to use solar heat to supplement fossil fuel heating of existing structures and to displace the use of fossil fuels entirely during periods of moderate atmospheric temperatures and/or plentiful sunshine, to conserve and extend the supply of fossil fuels. The convection and infra-red suppressing protective covers of the present invention may also be utilized with solar collectors of the prior art, such as those untilizing a film of water flowing over a heat absorptive plate.

Heretofore, proponents of solar heating have been primarily concerned with establishing the feasibility and practicality of this use of the sun's energy, with little concern for aesthetic considerations. Transparent and translucent plastic sheet material is already an accepted construction material which is available in a variety of colors and surface textures, and can be made in an almost unlimited variety. Thus, materials can be selected which are visually pleasing such that the building utilizing solar collectors can be made less obtrusive than has been possible in the past.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A solar heat collector comprising:
   A. a heat insulative base,
   B. a layer of heat absorptive material overlying said insulative base,
   C. a light transmitting insulating protective covering overlying said heat absorptive material, said covering being impervious to the passage of air and functioning as an air buffer, and including:
      1. an outer non-porous light transmitting sheet of air impermeable material spaced from said heat absorptive material,
      2. a layer of light transmitting insulating material under said outer sheet and substantially coextensive therewith and confined within and occupying at least part of the space between said outer sheet and the heat absorptive layer, said insulating material being a lightweight packing having a myriad of gas-containing voids substantially uniformly distributed throughout the mass of the packing and sandwiched between said outer sheet an intermediate non-porous sheet of air impermeable material overlying said heat absorptive layer, and
   D. passage means spaced from said insulating layer for circulating a heat transfer fluid through the collector in close proximity to said heat absorbing layer.

2. A solar heat collector according to claim 1 further characterized in that said packing is a batt of fibrous material selected from the class consisting of glass, mineral, polymeric, cellulosic and animal fibers.

3. A solar heat collector according to claim 1 further characterized in that said packing is a sheet of polymeric foam.

4. A solar heat collector according to claim 1 further characterized in that said packing is composed of vibration and shock absorbing polymeric sheet material having bubbles and cells of entrapped gas therein.

5. A solar heat collector according to claim 1 further characterized in that:
   A. said protective covering is flexible and inflatable, comprised of at least two spaced apart flexible polymeric films,
   B. said covering defines one wall of said passage means for passage of gas to be heated, and
   C. said covering is maintained inflated by passage of a gaseous heat transfer fluid under pressure through said passage means.

6. A solar heat collector according to claim 5 further characterized in that said packing is a batt of fibrous material selected from the class consisting of glass, mineral, polymeric, cellulosic and animal fibers.

7. A light transmitting insulating protective covering for a solar heat collector, said covering being impervious to the passage of air and adapted to function as an air buffer and comprising:
   A. an outer non-porous light transmitting sheet of air impermeable material adapted to be spaced from a layer of heat absorptive material overlying an insulative base, and
   B. a layer of a light transmitting insulating material under said outer sheet and substantially coextensive therewith and confined within and occupying at least part of the space between said outer sheet and the heat absorptive layer, said insulating material being a lightweight packing having a myriad of gas-containing voids substantially uniformly distributed throughout the mass of the packing sandwiched between said outer sheet and an intermediate non-porous sheet of air impermeable material overlying said heat absorptive layer.

8. A solar heat collector according to claim 7, further characterized in that said packing is a batt of fibrous material selected from the class consisting of glass, mineral, polymeric, cellulosic and animal fibers.

9. A solar heat collector according to claim 7 further characterized in that said packing is a sheet of polymeric foam.

10. A solar heat collector according to claim 7 further characterized in that said packing is composed of vibration and shock absorbing polymeric sheet material having bubbles and cells of entrapped gas therein.

11. A solar energy system utilizing a gaseous heat transfer medium and comprising:
   A. a plurality of interconnected southerly facing solar heat collector units operated with a gaseous heat transfer medium, said collector units comprising:
      1. a heat insulative base,
      2. a layer of heat absorptive material overlying said insulative base,
      3. a light transmitting insulating protective covering overlying said heat absorptive material, said convering being impervious to the passage of air and functioning as an air buffer, and including:
         a. an outer non-porous light transmitting sheet of air impermeable material spaced from said heat absorptive material,
         b. a layer of a light transmitting insulating material under said outer sheet and substantially coextensive therewith and confined within said occupying at least part of the spaced between said outer sheet and the heat absorptive layer, said insulating material being a lightweight packing having a myriad of gas-containing voids substantially uniformly distributed throughout the mass of the packing and sandwiched between said outer sheet and an intermediate non-porous sheet of air impermeable material overlying said heat absorptive layer, and
      4. passage means spaced from said insulating layer for circulating a heat transfer fluid through the collector in close proximity to said heat absorbing layer;
   B. blower means for forcing a gaseous heat transfer medium through said collector units;
   C. heat exchanger means for passing the liquid heat transfer medium in heat exchanging flow with said gaseous heat transfer medium; and
   D. duct means interconnecting said blower means, collector units and heat exchanger means in a closed circuit for continuous circulation of said gaseous medium.

12. A solar energy system according to claim 11 further characterized in that:
   A. electric power means are provided to operate said blower, and
   B. sensor are provided to actuate said blower when solar intensity is sufficient for collector operation.

13. A solar energy system according to claim 11 further characterized in that said packing is a batt of fibrous material selected from the class consisting of glass, mineral, polymeric, cellulosic and animal fibers.

14. A solar energy system according to claim 11 further characterized in that:
   A. said protective covering is flexible and inflatable, comprised of at least two spaced apart flexible polymeric films,
   B. said covering defines one wall of said passage means for passage of the gas to be heated, and
   C. said covering is maintained inflated by passage of the gaseous heat transfer medium under pressure through said passage means.

* * * * *

UNITED STATES PATENT AND TRADEMARK OFFICE
CERTIFICATE OF CORRECTION

PATENT NO. : 4,015,582
DATED : April 5, 1977
INVENTOR(S) : Benjamin Y. H. Liu et al It is certified that error appears in the above-identified patent and that said Letters Patent are hereby corrected as shown below:

Column 1, line 54, after "wide", insert --)--.

Column 1, line 59, "surfacs" should be --surfaces--.

Column 3, line 5, "blcak" should be --black--.

Column 4, line 63, after "layers.", "medium" should be omitted.

Column 5, line 65, "collectcr" should be --collector--.

Column 6, Claim 1, subparagraph 2, line 10, after "sheet", second occurrence, insert --and--.

Column 8, line 3, (Claim 11), "convering" should be --covering--

Column 8, line 10, (Claim 11), "said" should be --and--.

Column 8, line 11, (Claim 11), "spaced" should be --space--.

Column 8, line 38, (Claim 12, subparagraph B, line 1), after "sensor" insert --means--.

Signed and Sealed this

Thirteenth Day of September 1977

[SEAL]

Attest:

RUTH C. MASON
Attesting Officer

LUTRELLE F. PARKER
Acting Commissioner of Patents and Trademarks